(12) United States Patent
Van Schyndel

(10) Patent No.: US 6,421,444 B1
(45) Date of Patent: Jul. 16, 2002

(54) EMBEDDED HIGHER ORDER MICROPHONE

(75) Inventor: Andre John Van Schyndel, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 1128 days.

(21) Appl. No.: 08/535,404

(22) Filed: Sep. 28, 1995

(51) Int. Cl.$^7$ .............................. H04M 1/00; H04M 9/00
(52) U.S. Cl. ...................... 379/433; 379/388; 379/420; 379/428
(58) Field of Search ................................. 379/121, 388, 379/420, 428, 433; 381/91, 155, 173

(56) References Cited

U.S. PATENT DOCUMENTS

| | | | |
|---|---|---|---|
| 4,420,657 A | * 12/1983 | Larkin | 379/430 |
| 4,528,426 A | * 7/1985 | Fatoric et al. | 381/155 |
| 4,742,548 A | 5/1988 | Sessler et al. | 381/92 |
| 5,121,426 A | 6/1992 | Baumhauer, Jr. et al. | 379/388 |
| 5,168,525 A | * 12/1992 | Muller | 381/91 |
| 5,226,076 A | * 7/1993 | Baumhauer, Jr. et al. | 379/388 |
| 5,239,578 A | 8/1993 | Regen et al. | 379/387 |

FOREIGN PATENT DOCUMENTS

| | | | |
|---|---|---|---|
| CA | 1199138 | 1/1986 | 379/109 |
| DE | A-39 07 895 | 11/1989 | |
| EP | A-0 330 364 | 8/1989 | |
| EP | A-0 493 361 | 7/1992 | |
| WO | WO-A-92 22176 | 12/1992 | |

* cited by examiner

*Primary Examiner*—Allan Hoosain

(57) ABSTRACT

A mounting arrangement for a handset, neckset and the like having a transmit and a receive end. A regular-shaped cavity is provided at the transmit end for receiving a higher order microphone capsule, having two or more poles. The capsule is symmetrically fixed with the geometrical center substantially corresponding with the geometrical center of the cavity. The transversal size of the capsule is less or equal to the depth of the cavity. In this way, the capsule is embedded into the cavity, and the cavity is covered with an acoustically transparent screen. There is space left between the poles of the microphone and the facing walls of the cavity for fooling the microphone that it is in free space.

15 Claims, 4 Drawing Sheets

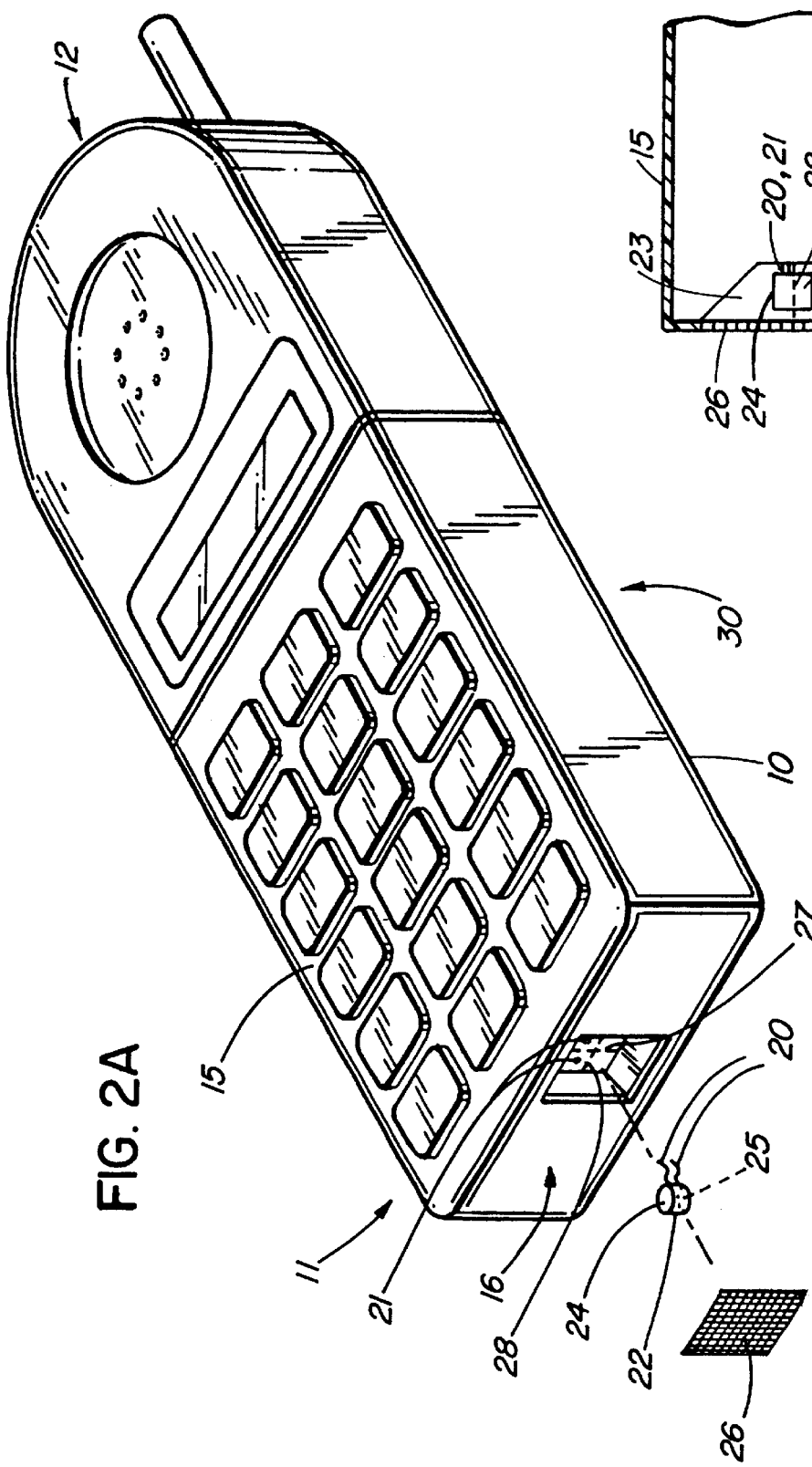
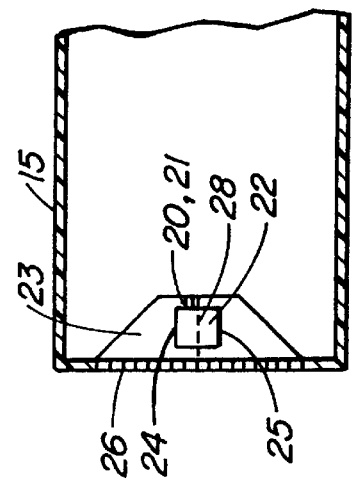
FIG. 2A
FIG. 2B

EMBEDDED HIGHER ORDER MICROPHONE

FIELD OF THE INVENTION

This invention relates to a mounting arrangement for a noise canceling microphone, and more particularly to a mounting arrangement for a higher order microphone within a small terminal such as a handset, portable terminal, or a neckset.

BACKGROUND OF THE INVENTION

Modern microphones for use in speech terminals are required to provide improved transmission characteristics. There are essentially two types of microphones widely used in telephony, namely pressure microphones, or zeroth order microphones, and pressure gradient microphones, or first order microphones.

Microphones higher than zeroth order are used to provide some immunity to acoustic noise. These microphones can discriminate sounds both by source direction and source proximity.

Pressure microphones have an omnidirectional directivity pattern, while pressure gradient microphones can have directivity patterns such as cardioid, which are most sensitive to sounds impinging from in front of the microphone, decreasing as the direction approaches the back, or "FIG. 8", which are most sensitive to sounds impinging from the front and back, and least sensitive to sounds impinging from sides. These types of noise canceling microphones need to have access to the sound field in more than one place, requiring two or more ports. A first order microphone is made to be sensitive to a combination of the sum of, and difference between the pressure at two ports. Second and higher order microphones require three or more ports, and the sensitivity is proportional to a combination of the sum of, and the difference between the pressure at these ports.

Ideally, such microphone assemblies (capsules) should operate in a substantially free-field environment in order to have the best noise-canceling effect. This presents a problem in mounting the capsule in a telephone housing due to the increased acoustic impedance presented to the ports, and to diffraction. These effects generally degrade the noise canceling performance of the microphone and alter the frequency response. The following requirements should be taken into consideration to circumvent these effects:

1. diffraction around and reflection from the terminal should not substantially alter the acoustic characteristics of the noise (i.e. planar nature of the wavefronts, and the effective impinging direction);
2. the ports in the housing should be short;
3. the acoustic impedance of the ports in the housing should be much less than the acoustic input impedance of the microphone; and
4. the ports in the housing need to have a high degree of acoustic symmetry.

In modern telephone handsets, the microphone ports are often at the front and back, which usually violates requirements 1 and 4. Some known architectures use a flap for accommodating the microphone. When port locations are the front and back of the flap, as is usually the case, requirements 1 and 4 are again violated.

In most mounting schemes, it is difficult to satisfy requirement 3 because it usually requires careful sealing of the microphone to the housing. This is difficult and expensive in a high volume manufacturing environment. Requirement 2 is usually difficult to meet if substantially electrostatic discharge immunity is needed.

Objects of the Invention

It is an object of this invention to effectively use a noise canceling microphone in a terminal to substantially reduce background noise without adversely affecting the transmitted voice signal.

Another object of the present invention is to provide a mounting arrangement for a noise canceling apparatus that is compact in structure and simple in construction so that it can readily be implemented in a standard telephone handset, a wireless terminal, a neckset or the like.

It is another object of this invention to provide a mounting arrangement for an embedded microphone which complies with the above four requirements.

SUMMARY OF THE INVENTION

Briefly stated, according to one aspect, the invention comprises a mounting arrangement for a telephone handset and the like, the handset having a transmit end for housing a capsule with an electroacoustic transducer and two ports, the arrangement comprising walls defining a regular-shaped cavity at the transmit end, and means for fixing the capsule into the cavity with the geometrical center of the capsule substantially corresponding with the geometrical center of the cavity and leaving substantially equal free space around each of the ports.

According to another aspect, the invention comprises a method for mounting a capsule with an electroacoustic transducer into a housing of a telephone handset and the like, comprising the steps of selecting a capsule with two ports, a longitudinal size and a transversal size, providing a regular-shaped cavity at the transmit end of the telephone handset with a depth equal or higher than the transversal size of said capsule, and fixing the capsule into the cavity with the geometrical center of the capsule substantially corresponding with the geometrical center of the cavity and leaving substantially equal free space around each of the ports.

Advantageously, the embedded microphone of the present invention has demonstrable, effective noise reduction characteristics.

Another advantage of the present invention is that it presents a solution for placement of the microphone that is simple, inexpensive and can be implemented in most types of voice terminals.

BRIEF DESCRIPTION OF THE DRAWINGS

Exemplary embodiments of the invention will now be described with reference to the accompanying drawings, in which:

FIG. 2a shows an exploded perspective view of a handset with the embedded microphone according to the present invention;

FIG. 2b is a sectional view of the transmitting end of a handset with the embedded microphone;

DESCRIPTION OF THE PREFERRED EMBODIMENT

Figure 1:
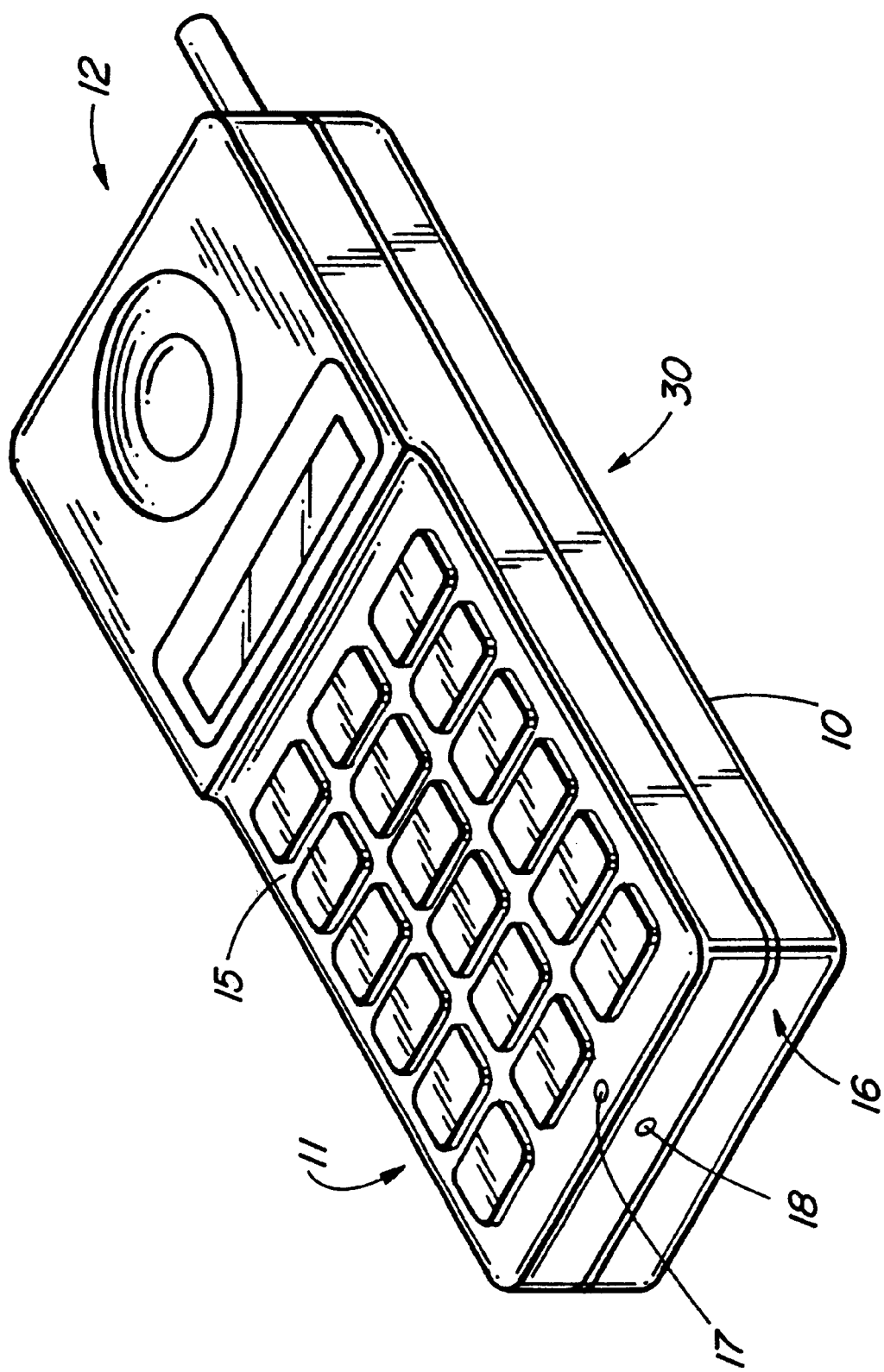
FIG. 1 illustrates a prior art implementation of a microphone placed in a handset terminal.

Referring now to FIG. 1, a telephone handset comprises a housing 10 having a transmit end 11 and a receive end 12. A microphone is placed at the transmit end 11 and a receiver is placed at the receive end 12. The transmit end 11 has openings 17 and 18, each arranged respectively on face 15 and 16. It is apparent that mounting the microphone as illustrated in FIG. 1, so that one port is on the face plate, and the other is on the end of the terminal, can meet requirement 2, but does not comply with requirements 1 and 4.

FIGS. 2a and 2b illustrate an implementation for a handset according to this invention, where the microphone 22 is embedded with zero profile into a cavity 23 provided in the end face 16 of housing 10.

Cavity 23 should be deep enough so that the microphone capsule 22 is fully received therein, while leaving free space in the cavity around the poles of the microphone. While the depth of the cavity is determined mostly by the diameter of the capsule 22, the distance between each port and the facing cavity wall is determined by the design restrains of the housing and the acoustic impedance of the microphone assembly, as will be discussed later in further detail. In this way, the microphone is practically in an open space. It is not necessary for any of the microphone ports 24 and 25 to actually be visible from the direction of the sound source.

Although applicable to other higher order microphones, the invention is particularly effective with microphones which have a front to back symmetry such as the "FIG. 8" pattern, or dipole microphone. Diffraction and reflection of noise impinging on the side of the microphone (the direction of minimum sensitivity) is symmetric and therefore does not hinder the intrinsic noise canceling ability of the microphone. This meets requirement 1 above. The large openings to the spaces above and below the microphone serve to meet requirement 3 above.

Cavity 23 is selected to have a substantially regular shape, for enabling symmetrical positioning of the microphone inside it. Preferably, the walls facing the microphone ports are inclined outwardly, as illustrated in FIGS. 2a and 2b. The microphone 22 is fixed in the center of the cavity. It is important that the geometrical center of the cavity substantially coincides with the geometrical center of the microphone, for obtaining a high degree of acoustic symmetry (requirement 4) between the front and the back of the microphone.

Cavity 23 must also allow enough free space around the ports so that the acoustic impedance of the ports is much less than the acoustic impedance of the microphone. If the ports impedance is low, it will only negligibly alter the pressure received at microphone ports 24 and 25.

The capsule with microphone 22 is fixed within the cavity 23 with any suitable fixing means. In order to obtain a symmetrical mounting arrangement, the port axis (P) of the capsule 22 should be parallel with the bottom wall of the cavity. In addition, the geometrical center of the capsule should coincide with the geometrical center of the cavity. As an example, the capsule may be fixed with a suitable type of glue along dotted line 27. As well, capsule 22 may be fixed into the cavity 23 using tabs positioned along dotted line 28.

The electrical signals obtained with the microphone 22 are carried to the electronics of the receiver through wires 20 which are inserted into the housing through holes 21.

Cavity 23 is covered with an acoustically transparent screen 26, which protects the microphone while allowing the sound waves to enter the cavity and arrive at ports 24 and 25 unobstructed.

When the set illustrated in FIG. 1 is used handsfree, it is generally positioned at some 30 cm so that face 15 faces the user. This implementation of the microphone would not only have the most sensitive direction pointed at the user, but can simultaneously point a null of the set's loudspeaker if a dipole microphone is used.

In summary, selection of the acoustic design and the place of the cavity should take into account the type and size of the microphone assembly and the architecture of the housing.

Figure 3A:
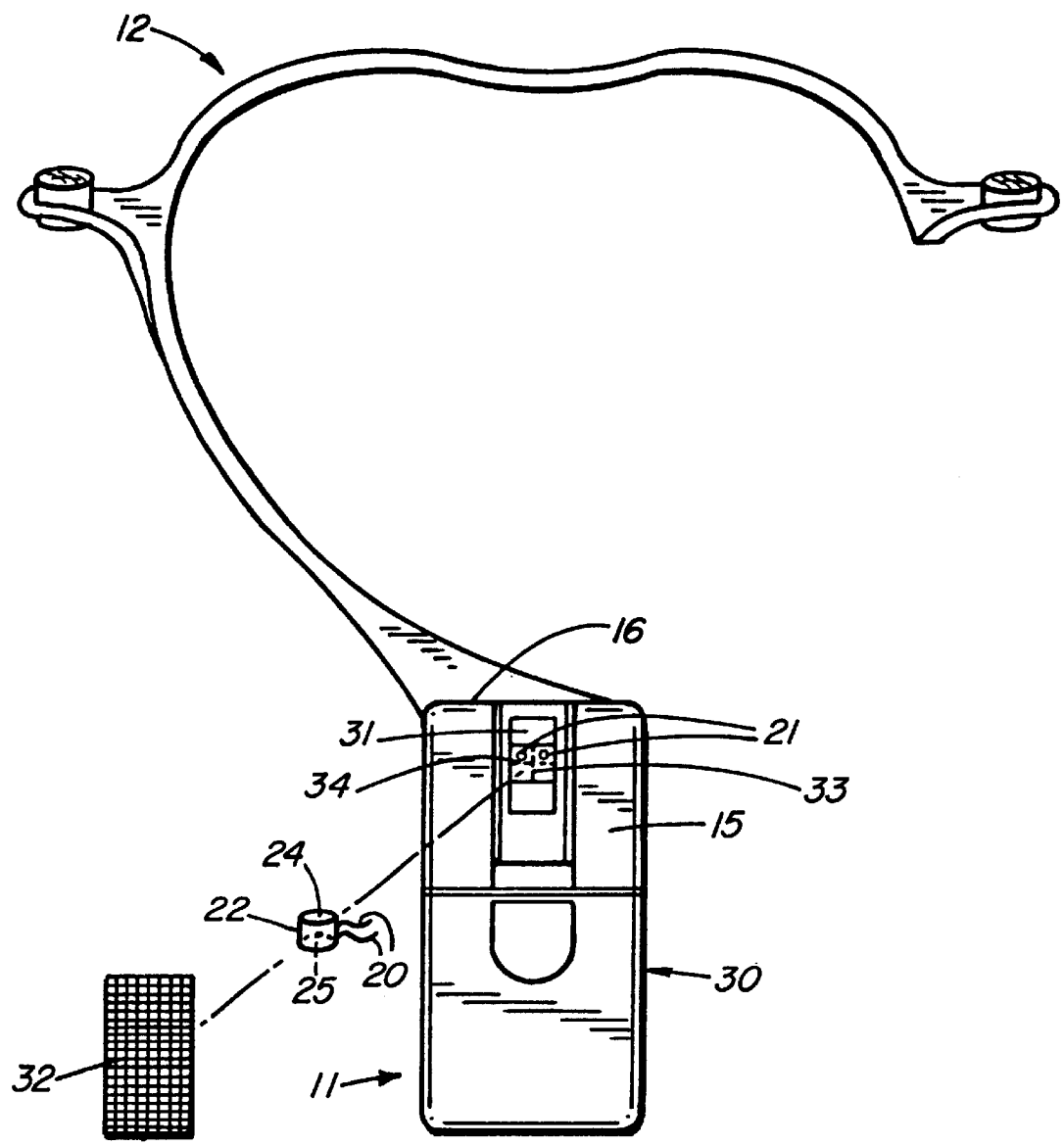
FIG. 3a is an exploded view of a neckset with the embedded microphone.

FIG. 3a illustrates the implementation for a neckset. Such neckset is disclosed and claimed in U.S. application Ser. No. 08/611,961, filed Mar. 7, 1996, which is a Continuation-In-Part of U.S. application Ser. No. 08/257,254, filed Jun. 8, 1994, now abandoned. As seen in FIG. 3a, the microphone is sufficiently far from the user that some noise cancellation is appropriate. The microphone is embedded into the front face 15 of the housing 30, with zero profile, and is covered with a screen 32.

The capsule with microphone 22 is fixed within the cavity 31 with any suitable fixing means. In order to obtain a symmetrical mounting arrangement, the capsule median transversal plane should coincide with the median plane of cavity 31. As an example, the capsule may be fixed with a suitable glue along dotted line 33. As well, capsule 22 may be fixed into the cavity 31 using tabs positioned along dotted line 33. In addition, the capsule may be fixed inside the cavity using a narrow wall extending as a bridge across the opening, for additionally supporting the capsule between the bridge and the bottom wall of the cavity.

Figure 3B:
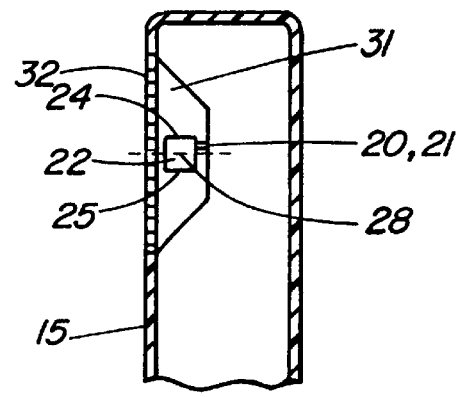
FIG. 3b is a sectional view of the transmitting end of a neckset with the embedded microphone.

All four requirements are met and the "dribble" problem is also solved. As seen in FIGS. 3a and 3b, since the geometry allows, cavity 31 is larger than in the case of the handset, and a lower acoustic impedance is obtained.

In addition, in the case of the neckset illustrated in FIGS. 3a and 3b, the quality of the sound is advantageously enhanced by the fact that the body of the wearer obstructs the noise coming from the side opposed to the opening of the cavity.

Figure 4:
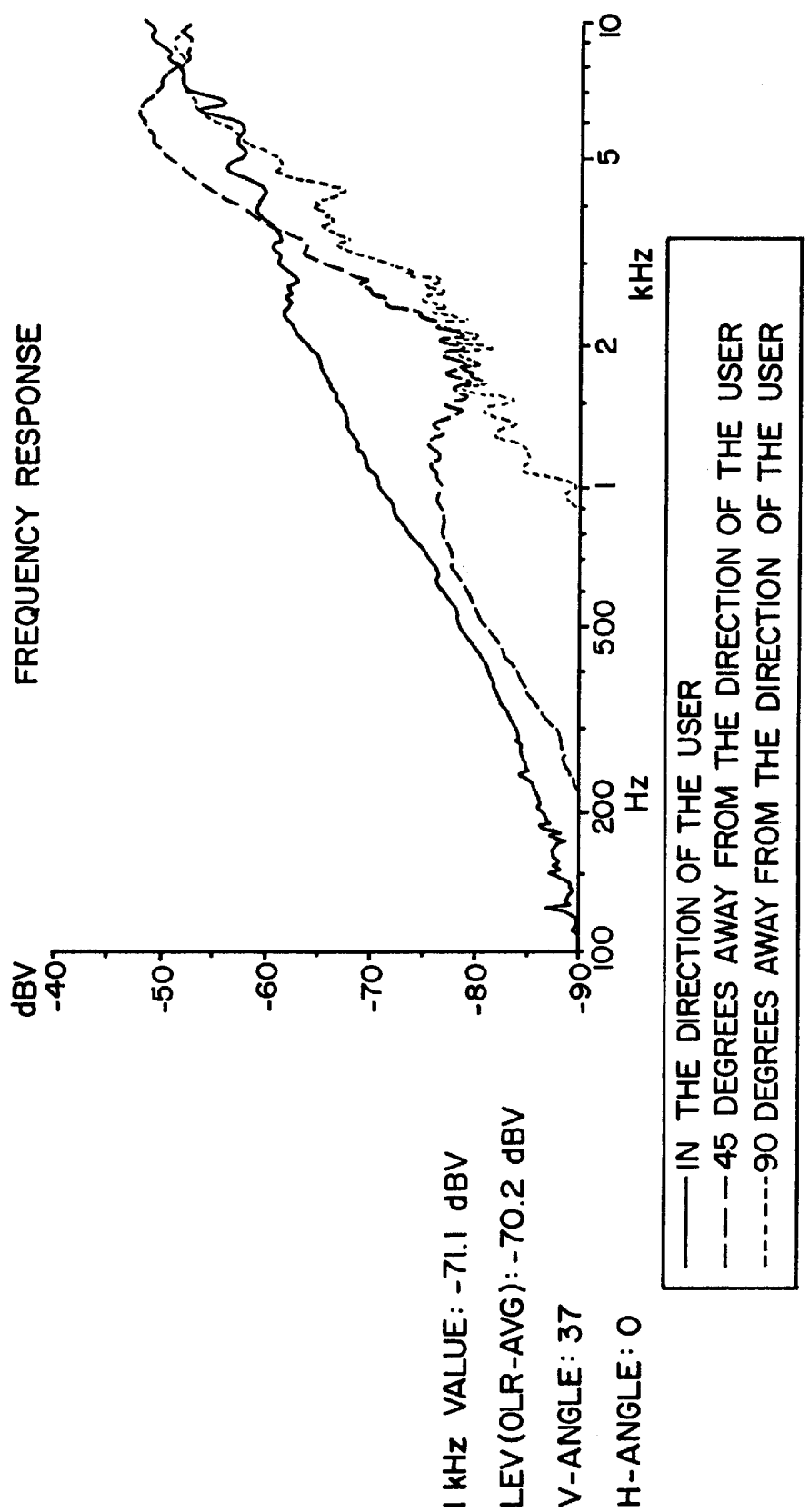
FIG. 4 illustrates the frequency response of the arrangement illustrated in FIGS. 3a and 3b for a number of source directions.

The directional properties of the example of FIG. 3, were measured and are shown in FIG. 4. FIG. 4 shows that the sensitivity in the direction of the user is significantly better than at 45 degrees away, and markedly better still than at 90 degrees away (in the direction of computers, keyboards, other talkers, etc.).

While a preferred embodiment is disclosed and illustrated herein, it will be understood that the invention may be otherwise embodied within the true spirit and scope of the invention, as defined by the appended claims. The mounting arrangement disclosed herein may well be used in other sound transducer schemes and it is not limited to the use in the telephone handsets or necksets.

What is claimed is:

1. A mounting arrangement for a speech terminal, operating in close-talk and hands-free modes said terminal having a transmit end for housing a capsule with an electroacoustic transducer and two ports, said arrangement comprising:

walls defining a regular-shaped cavity at said transmit end a first side wall and a second side wall opposed to said first side wall being outwardly inclined; and means for fixing said capsule into said cavity with the geometrical center of said capsule substantially corresponding with the geometrical center of said cavity, for leaving substantially equal free space around each of said ports, and with a first port of said electroacoustic transducer facing said first side wall of said cavity and a second port facing said second side wall of said cavity.

2. A mounting arrangement as claimed in claim 1 wherein said electroacoustic transducer is a first order microphone.

3. A mounting arrangement as claimed in claim 1 wherein said electroacoustic transducer is a higher order microphone.

4. A mounting arrangement as claimed in claim 1, said capsule having a longitudinal size and a transversal size, wherein said cavity has a depth substantially equal to said transversal size of said capsule.

5. A mounting arrangement as claimed in claim 1, wherein the acoustic impedance of each said port in said cavity is less than the acoustic impedance of said transducer.

6. A mounting arrangement as claimed in claim 1, further comprising an acoustically transparent screen for environmental sealing of said capsule in said cavity.

7. A mounting arrangement as claimed in claim 1, wherein said means for fixing is a silicon type glue.

8. A speech terminal operating in close-talk and hands-free modes comprising:
   a housing with a transmit end and a receive end;
   walls defining a regular-shaped cavity at said transmit end, a first side wall and a second side wall opposed to said first side wall being outwardly inclined;
   a capsule with an electroacoustic transducer and two ports, said capsule having a longitudinal size and a transversal size; and
   means for fixing said capsule into said cavity with the geometrical center of said capsule substantially corresponding with the geometrical center of said cavity for leaving substantially equal free space around each of said ports, and with a first port of said electroacoustic transducer facing said first side wall of said cavity and a second port facing said second side wall of said cavity.

9. A speech terminal as claimed in claim 8, wherein said cavity has a depth substantially equal to said transversal size of said capsule.

10. A speech terminal as claimed in claim 8, wherein the acoustic impedance of each said port in the housing is substantially less than the acoustic impedance of said transducer.

11. A speech terminal as claimed in claim 8, further comprising an acoustically transparent screen for environmental sealing of said capsule in said cavity.

12. A method for mounting a capsule with an electroacoustic transducer into a housing of a speech terminal, for operation in close-talk and hands-free modes comprising the steps of:
   selecting a capsule with two ports, a longitudinal size and a transversal size;
   providing a regular-shaped cavity at the transmit end of said speech terminal, said cavity having a first and a second outwardly inclined side walls opposed to each other, with a depth substantially equal to said transversal size of said capsule; and
   fixing said capsule into said cavity with the geometrical center of said capsule substantially corresponding with the geometrical center of said cavity to leave substantially equal free space around said ports, and with a first port of said electroacoustic transducer facing said first side wall of said cavity and a second port facing aid second side wall of said.

13. A method as claimed in claim 12, wherein said electroacoustic transducer is a first order microphone.

14. A method as claimed in claim 12, wherein said electroacoustic transducer is a higher order microphone.

15. A method as claimed in claim 12, wherein the acoustic impedance of each said port in the housing is less than the acoustic impedance of said transducer.

* * * * *